(12) United States Patent
Migaki (10) Patent No.: US 9,505,356 B2
(45) Date of Patent: Nov. 29, 2016

(54) VEHICULAR INTERIOR PART (71) Applicant: TOYOTA BOSHOKU KABUSHIKI KAISHA, Aichi-ken (JP)

(72) Inventor: Yohei Migaki, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/750,478

(22) Filed: Jun. 25, 2015

(65) Prior Publication Data
US 2016/0001714 A1 Jan. 7, 2016

(30) Foreign Application Priority Data
Jul. 2, 2014 (JP) .................... 2014-136602

(51) Int. Cl.
B60R 13/02 (2006.01)
B60R 21/04 (2006.01)

(52) U.S. Cl.
CPC ........... B60R 13/0206 (2013.01); B60R 13/02 (2013.01); B60R 13/0237 (2013.01); B60R 13/0243 (2013.01); B60R 21/0428 (2013.01)

(58) Field of Classification Search
CPC ....... B60J 5/045; B60J 5/0456; B60R 13/02; B60R 13/0206; B60R 13/0243; B60R 21/02; B60R 21/04; B60R 21/0428
USPC .............. 296/1.08, 39.1, 146.7, 152, 153
See application file for complete search history.

(56) References Cited

FOREIGN PATENT DOCUMENTS

| JP | 06270676 A | * 9/1994 |
| JP | 2000-103230 | 4/2000 |
| JP | 2010264835 A | * 11/2010 |

OTHER PUBLICATIONS

English translation of JP 2010-264835; retreived May 13, 2016 from the Japan Platform for Patent Information located at https://www.j-platpat.inpit.go.jp/web/all/top/BTmTopEnglishPage.*
English translation of JP 06-270676; retreived May 13, 2016 from the Japan Platform for Patent Information located at https://www.j-platpat.inpit.go.jp/web/all/top/BTmTopEnglishPage.*

* cited by examiner

*Primary Examiner* — Jason S Daniels
(74) *Attorney, Agent, or Firm* — Greenblum & Bernstein, P.L.C.

(57) ABSTRACT

A vehicular interior part includes an interior part and a trim main body where the interior part is mounted. The interior part includes an interior part main wall portion and a mount projection projecting from a rear surface of the interior part main wall portion. The trim main body includes a main body side wall portion and an extended portion extending from the main body side wall portion toward a middle portion of the trim main body. The extended portion includes an insertion through hole in which the mount projection is and a clearance portion adjacent to the insertion through hole and with which the extended portion is movable toward the middle portion of the trim main body relative to the mount projection that is in the insertion through hole in response that the main body side wall portion receives a load in a vehicular interior-exterior direction.

14 Claims, 5 Drawing Sheets

VEHICULAR INTERIOR PART

CROSS REFERENCE TO RELATED APPLICATION

This application claims priority from Japanese Patent Application No. 2014-136602 filed Jul. 2, 2014. The entire contents of the priority application are incorporated herein by reference.

FIELD OF THE INVENTION

The present disclosure relates to a vehicular interior part.

BACKGROUND

There has been a door trim (a vehicular interior part) including an armrest. The armrest has a rear edge surface including a cutaway groove so that the armrest is easily broken in a collision. If the armrest receives shock in a side collision, a thin portion of the armrest is broken along the cutaway groove and the rear edge surface of the armrest having a box shape is opened widely to have a substantially L-shaped opening. Accordingly, the armrest is easily broken and effectively absorbs the shock.

However, in such a configuration, the rear edge surface of the armrest that is a side wall of the door trim has rigidity that is lower than rigidity of a side wall without having the groove. Therefore, the rigidity of the door trim during a normal usage may be lowered.

In the above configuration, the groove is formed on a surface that is opposite from a design surface of the side wall of the door trim. Therefore, unevenness in gloss may occur on the design surface of the side wall and this may deteriorate the design.

SUMMARY OF THE INVENTION

An objective of the present technology is to provide a vehicular interior part that maintains rigidity during a normal usage and design and also improves shock absorbing properties in a side collision.

According to the present technology, a vehicular interior part includes a main wall portion having a main surface facing a vehicular interior side and having an outer peripheral edge and a middle portion, a side wall portion extending from the outer peripheral edge toward a vehicular exterior side, an interior part, and a trim main body. The interior part includes an interior part main wall portion that is a part of the main wall portion and having a rear surface that is opposite to the main surface, and a mount projection projecting from the rear surface. The trim main body is mounted on the interior part and on a vehicular exterior side with respect to the interior part, and the trim main body includes a main body side wall portion that is a part of the side wall portion, and an extended portion extending from the main body side wall portion toward the middle portion of the main wall portion along the rear surface of the interior part main wall portion. The extended portion includes an insertion through hole and a clearance portion. The mount projection is in the insertion through hole and the clearance portion is adjacent to the insertion through hole and with the clearance portion, the extended portion is movable toward the middle portion of the main wall portion relative to the mount projection that is in the insertion through hole in response that the main body side wall portion receives a load in a vehicular interior-exterior direction.

DETAILED DESCRIPTION

First Embodiment

A first embodiment of the present technology will be described with reference to FIGS. 1 to 4. According to this embodiment, a door trim 20 that is an example of a vehicular interior part mounted in a vehicle will be described. in FIG. 1, a left side corresponds to a vehicular front side and a right side corresponds to a vehicular rear side.

The door trim 20 is mounted on a vehicular interior side of a vehicular panel including an inner panel 12 (see FIG. 2) and an outer panel (not illustrated), and the door trim 20 and the vehicular panel constitute a vehicular door. The vehicular door is arranged on a side of a seat where an occupant seats and used as a vehicular side door.

The door trim 20 mainly includes a trim board 21 that has a plate-like shape. The trim board 21 is made of synthetic resin material such as polypropylene. The material of the trim board 21 is not necessarily limited to the synthetic resin but may be a mixture of wood-based material and synthetic resin.

Figure 1:
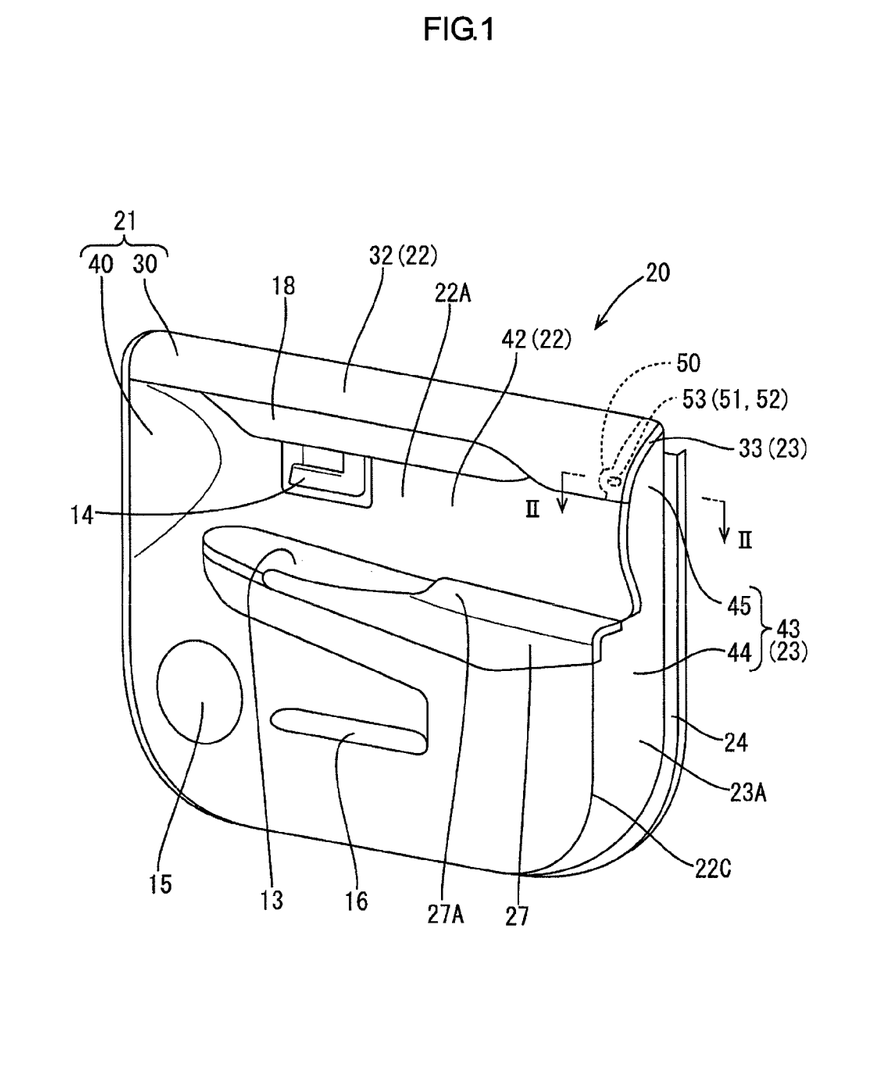
FIG. 1 is a perspective view of a door trim according to a first embodiment.

As illustrated in FIG. 1, the trim board 21 includes a main wall portion 22 and a side wall portion 23. The main wall portion 22 has a main surface 22A facing the vehicular interior side. The side wall portion 23 extends from an outer peripheral edge 22C of the main wall portion 22 toward a vehicular exterior side. Specifically, the trim board 21 includes the main wall portion 22 and the side wall portion 23. The main wall portion 22 has a rectangular shape having a substantially same size as the inner panel 12 and the side wall portion 23 extends toward the vehicular exterior side from a vehicular front edge, a vehicular lower edge, and a vehicular rear edge of the main wall portion 22, respectively. The trim board 21 has a shallow box shape that is open toward the inner panel 12. The trim board 21 includes the main wall portion 22 as a bottom surface of the shallow box shape and the side wall portion 23 as a side surface thereof. The trim board 21 further includes a flange portion 24 (an exterior edge portion) that extends from a vehicular exterior side edge of the side wall portion 23 to form a flanged shape.

Figure 2:
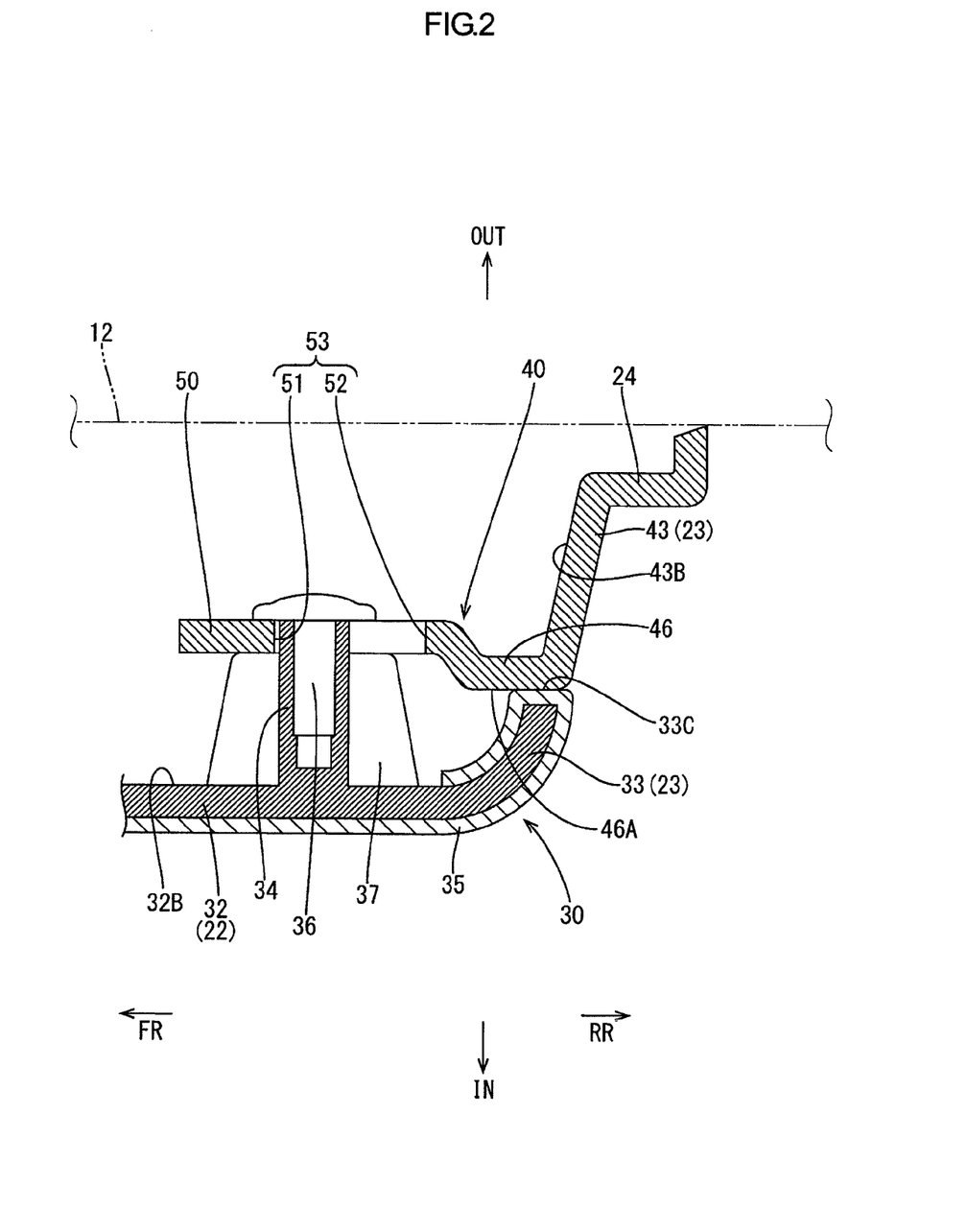
FIG. 2 is a cross-sectional view of a part of the door trim including an upper board and a main board in FIG. 1 (taken along line II-II in FIG. 1).

The main wall portion 22 is opposite the door panel (the inner panel 12) as illustrated in FIG. 2. The main wall portion 22 receives a load caused in the side collision. The load is transferred from the vehicular exterior side to the main wall portion 22 via the door panel (the inner panel 12). The main wall portion 22 has the main surface 22A that is a design surface facing the vehicular interior side (occupants). The main surface 22A is a surface opposite to a surface of the main wall portion 22 facing the inner panel 12.

As illustrated in FIG. 2, the side wall portion 23 including the interior part side wall portion 33 and the main body side wall portion 43 extends in a vehicular interior-exterior direction. The interior part side wall portion 33 included in the side wall portion 23 is continuous from and is integrally formed with the main wall portion 22. The main body side wall portion 43 included in the side wall portion 23 is in contact with the inner panel 12 directly or indirectly via the flange portion 24. If the inner panel 12 is moved into the vehicular interior side and comes in contact with the side wall portion 23 in the side collision, the side wall portion 23 functions as a protection wall located between the main wall portion 22 and the inner panel 12.

As illustrated in FIG. 1, the surface 23A of the side wall portion 23 that faces an exterior side of the main wall portion 22 (the main surface 22A) is seen by an occupant as a design surface when the vehicular door is open. The surface 23A is covered or overlapped with a pillar that is arranged adjacent to the vehicular door and is less likely to be seen from the vehicular interior side when the vehicular door is closed.

As illustrated in FIG. 1, the trim board 21 includes an upper board 30 that constitutes an upper portion of the trim board 21 and a main board 40 that constitutes a most portion below the upper board 30. As illustrated in FIG. 2, the upper board 30 (the interior part) is mounted on the main board 40 (the trim main body) on the vehicular interior side with respect to the main board 40. Specifically, the upper board 30 and the main board 40 have a mounting portion in vehicular rear portions thereof and the upper board 30 is mounted on the main board 40 on the vehicular interior side with respect to the main board 40. A lower middle part of the upper board 30 is arranged on the vehicular exterior side with respect to the main board 40. The main board 40 and a decoration part 18 are mounted on the lower middle part of the upper board 30 on the vehicular interior side with respect to the upper board 30.

As illustrated in FIG. 2, a skin 35 may be provided on a surface of the upper board 30. Examples of the skin may include leather such as natural leather and synthetic leather, or include a cloth such as woven fabric, a knitted fabric, and a non-woven cloth. With such a configuration, the door trim 20 has an improved design.

As illustrated in FIG. 2, the upper board 30 includes an interior part main wall portion 32 that is a part of the main wall portion 22 and an interior part side wall portion 33 that is a part of the side wall portion 23. The interior part side wall portion 33 extends from an outer peripheral edge (a vehicular rear edge) of the interior part main wall portion 32 toward the vehicular exterior side. The upper board further includes a mount projection 34 that projects from a rear surface 32B of the interior part main wall portion 32 (a surface opposite to the main surface 22A). The upper board 30 is mounted on the main board 40 via the mount projections 34.

The interior part main wall portion 32 is elongated along the vehicular front-rear direction and is a vehicular upper part of the main wall portion 22. As illustrated in FIG. 2, the interior part side wall portion 33 extends from the interior part main wall portion 32 toward the vehicular rear side and the vehicular exterior side with being curved and constitutes a vehicular interior side upper portion of the side wall portion 23. An edge portion of the skin 35 extends around a side edge portion 33C of the interior part side wall portion 33 toward a rear surface of the interior part side wall portion 33. The interior part side wall portion 33 keeps the edge portion of the skin 35 provided on the rear surface of the interior part side wall portion 33 from coming in contact with the mount projection 34.

As illustrated in FIG. 2, the mount projection 34 has a tubular or a cylindrical shape and has a mount hole therein where a screw 36 is fastened. The mount projection 34 includes reinforcing ribs 37 that extend from an outer surface of the mount projection 34 in the vehicular front-rear direction and the upper-lower direction and form a cross shape. The reinforcing ribs 37 are continuous from the rear surface 32B of the interior part main wall portion 32. The mount projection 34 and the reinforcing ribs 37 are formed integrally with the interior part main wall portion 32. A mounting configuration where the upper board 30 is mounted on the main board 40 via the mount projection 34 will be described later.

As illustrated in FIG. 1, the main board 40 includes an armrest 27A. A part of the main board 40 projects toward the vehicular interior side to form the armrest 27A. The armrest 27A is located in a substantially middle portion of the door trim 20 with respect to the vehicular up-down direction and extends in the vehicular front-rear direction. The armrest 27A includes an armrest board portion 27 at a vehicular rear portion thereof. The armrest board portion 27 has an upper surface that is used as an armrest for an occupant. The armrest board portion 27 of the armrest 27A has a mount through hole 13 in a front portion thereof. A switch base (not illustrated) is mounted in the mount through hole 13. As illustrated in FIG. 2, the main board 40 includes an inside handle 14, a speaker grill 15, and door pocket 16.

As illustrated in FIG. 1, the main board 40 includes a main body main wall portion 42 that is a part of the main wall portion 22, a main body side wall portion 43 that is a part of the side wall portion 23, and an extended portion 50. The extended portion 50 extends from the main body side wall portion 43 toward a middle portion (an inner portion) of the main wall portion 22 (the main surface 22A). The extended portion 50 extends along the interior part main wall portion 32 and in the vehicular front-rear direction.

As illustrated in FIG. 1, the main body main wall portion 42 has a substantially rectangular shape and constitutes a lower portion of the main wall portion 22 that is below the interior part main wall portion 32. The main body side wall portion 43 includes a lower portion 44 and an upper portion 45 and constitutes most part of the side wall portion 23. The lower portion 44 extends from an outer peripheral edge of the main body main wall portion 42 (each of the vehicular front edge, a vehicular lower edge, and a vehicular rear edge) toward the vehicular exterior side. The upper portion 45 extends from an upper edge of the lower portion 44 that extends from the vehicular rear edge, and is located on the vehicular exterior side with respect to the interior part side wall portion 33.

As illustrated in FIG. 2, the main board 40 includes an extended basal portion 46 that extends from a vehicular interior side edge of the upper portion 45 of the main body side wall portion 43 toward the inner portion (the middle portion) of the main wall portion 22. The extended basal portion 46 extends from a rear surface 43B of the main body side wall portion 43. The extended basal portion 46 extends along the upper portion 45 in substantially an up-down direction to form a belt-like shape and has a vehicular interior side plate surface (a main surface of the belt-like shape) 46A. The side edge portion 33C of the interior part side wall portion 33 is arranged on the vehicular interior side plate surface 46A of the extended basal portion 46. An end surface of the side edge portion 33C is in contact with the vehicular interior side plate surface 46A. According to such a configuration, a design of the edge of the main body side wall portion 43 is improved compared to the configuration that the side edge portion 33C of the interior part side wall portion 33 is opposite the vehicular interior edge of the main body side wall portion 43.

Figure 4:
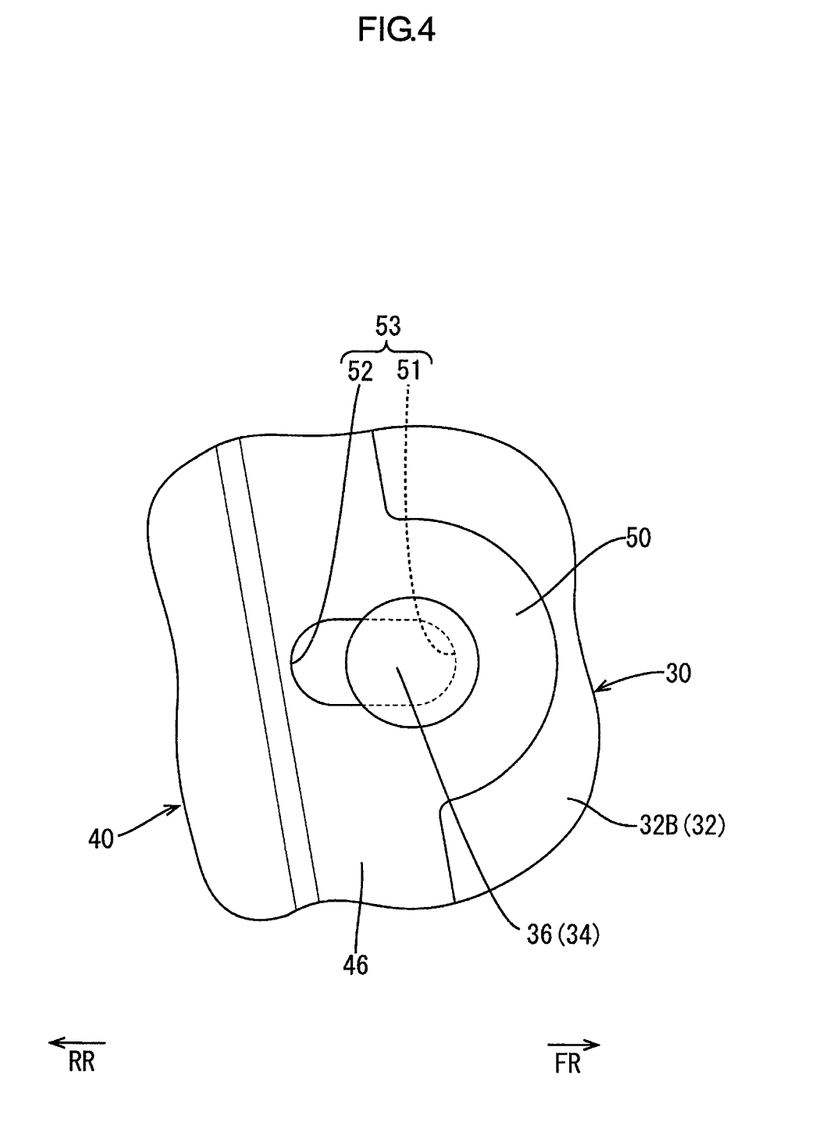
FIG. 4 is a rear plan view of a part of the door trim including an extended portion and a clearance portion.

As illustrated in FIG. 4, the extended portion 50 has a semicircular plan view shape. The extended basal portion 46 is elongated along an upper edge of the main body side wall portion 43, and a part of the extended basal portion 46 extends further in the extending direction in which the extended basal portion 46 extends from the edge of the main body side wall portion 43 to form the extended portion 50. The extended basal portion 46 is a basal portion from which the extended portion 50 extends in the extending direction.

The extended portion 50 extends from the rear surface 43B of the main body side wall portion 43 (opposite to the surface 23A of the side wall portion 23) toward the middle portion (the inner portion) of the main wall portion 22 (the main surface 22A) or a middle portion of the door trim 20 as a whole. Specifically, in this embodiment, the extended portion 50 extends from the main body side wall portion 43 on the vehicular rear side toward the vehicular front side. The extended portion extends from the main body side wall portion on the vehicular front side toward the vehicular rear side, and the extended portion extends from the main body side wall portion on the vehicular lower side toward the vehicular upper side.

As illustrated in FIG. 2, the extended portion 50 is arranged on the rear surface 32B side of the interior part main wall portion 32 and opposite the interior part main wall portion 32. The interior part main wall portion 32 includes the mount projection 34. The mount projection 34 projects from the surface 32B opposite the extended portion 50 toward the extended portion 50 and is mounted on the extended portion 50. The extended portion 50 has an elongated through hole 53 including the insertion through hole portion 51 through which the mount projection 34 is inserted. The elongated through hole 53 includes an insertion through hole portion 51 and a clearance portion 52 that are communicated with each other.

The insertion through hole portion 51 is formed to correspond to the mount projection 34 and overlap the mount projection 34 with respect to the vehicular interior-exterior direction. The insertion through hole portion 51 has a size and a shape substantially same as those of an outer shape of the mount projection 34 having a fit tolerance with respect to the mount projection 34. A mounting configuration in which the mount projection 34 is mounted on the extended portion 50 will be described later.

As illustrated in FIG. 2, the elongated through hole 53 including the insertion through hole 51 and the clearance portion 52 has an opening size greater than an opening size of the insertion though hole 51 and greater than a diameter of the mount projection 34. The elongated throughole 53 is elongated toward an outer periphery of the main wall portion 22. Therefore, the extended portion 50 relatively moves toward the inner portion (the middle portion) of the main wall portion 22 (the main surface 22A) with respect to the mount projection 34 inserted through the insertion through hole 51, when the main body side wall portion 43 receives a load in the vehicular interior-exterior direction.

The direction in which the extended portion 50 relatively moves with respect to the mount projection 34 is same as the direction in which the extended portion 50 extends from the main body side wall portion 43, that is, frontward. Specifically, the extended portion 50 moves frontward, that is, toward the middle portion (the inner portion) of the main wall portion 22 (the main surface 22A, the door trim 20 as a whole). The extended portion 50 that extends from the main body side wall portion 43 on the vehicular rear side moves frontward. The extended portion that extends from the main body side wall portion 43 on the vehicular front side moves rearward and the extended portion that extends from the main body side wall portion 43 on the vehicular lower side moves upward.

As illustrated in FIGS. 2 and 4, the clearance portion 52 is a through hole formed in the extended portion 50 and communicated with the insertion through hole 51 to form the elongated through hole 53.

As illustrated in FIG. 4, the elongated through hole 53 is elongated toward the outer periphery of the main wall portion 22 or in the vehicular front-rear direction. Namely, the elongated through hole 53 includes the insertion through hole portion 51 at a distal end portion of the extended portion 50 and includes the clearance portion 52 at a basal end portion of the extended portion 50. Thus, the elongated through hole 53 includes the insertion through hole 51 on the vehicular front side and includes the clearance portion 52 on the vehicular rear side. The insertion through hole 51 extends toward the basal portion of the extended portion 50 to form the elongated through hole 53. Specifically, in this embodiment, the insertion through hole 51 extends rearward in the extended portion 50 to form the elongated through hole 53. The insertion through hole 51 extends frontward or downward in the extended portion that extends from the main body side wall portion 43 on the front side or the main body side wall portion 43 on the lower side, respectively, to form the elongated through hole. In the elongated portion that extends from the main body side wall portion 43 on the vehicular front side, the elongated through hole includes the insertion through hole on the vehicular rear side and includes the clearance portion on the vehicular front side. In the elongated portion that extends from the main body side wall portion 43 on the vehicular lower side, the elongated through hole includes the insertion through hole on the vehicular upper side and includes the clearance portion on the vehicular lower side. The insertion through hole 51 does not extend to be away from the main body side wall portion 43 in the extended portion 50 to form the elongated through hole 53. Namely, the insertion through hole 51 extends only toward the outer periphery of the main wall portion 22 (the main surface 22A) or to be closer to the main body side wall portion 43 to form the elongated through hole 53. The clearance portion 52 is on the outer periphery side of the main wall portion 22 with respect to the insertion through hole 51, or the insertion through hole 51 is on the distal end side of the extended portion 50 with respect to the clearance portion 52.

The mount projection 34 is mounted on the extended portion 50 so that the upper board 30 is mounted on the main board 40. Such a mounting configuration of the upper board 30 and the main board 40 will be described.

The mount projection 34 is inserted through the insertion through hole 51 that is included on the distal end side of the extended portion 50 in the elongated through hole 53 with respect to the clearance portion 52. The mount projection 34 is held against a hole edge of the insertion through hole 51 included in the elongated through hole 53. Specifically, the mount projection 34 is inserted in a portion (the insertion through hole 51) of the elongated through hole 53 on a distal end side of the extended portion 50, that is, on a vehicular front side in the elongated through hole 53. The screw 36 is fastened into the mount hole of the mount projection 34 so that vehicular exterior side surfaces of the reinforcing ribs 37 and a top portion of the screw 36 sandwich the hole edge of the insertion through hole 51 therebetween and the mount projection 34 is mounted in the extended portion 50. The mount projection 34 is held at a C-shaped hole edge portion along the hole edge of the elongated through hole 53 but not held at a portion along the hole edge of the elongated through hole 53 on the outer side of the main wall portion 22 (the vehicular rear side) or close to the clearance portion 52. The C-shaped hole edge portion extends from an upper hole edge to a lower hole edge via a front hole edge. The upper board 30 may be mounted on the main board 40 via the mounting of the mount projection 34 and the extended portion 50 and further via other mounting portions.

Operations of the door trim 20 of this embodiment will be described.

Figure 3:
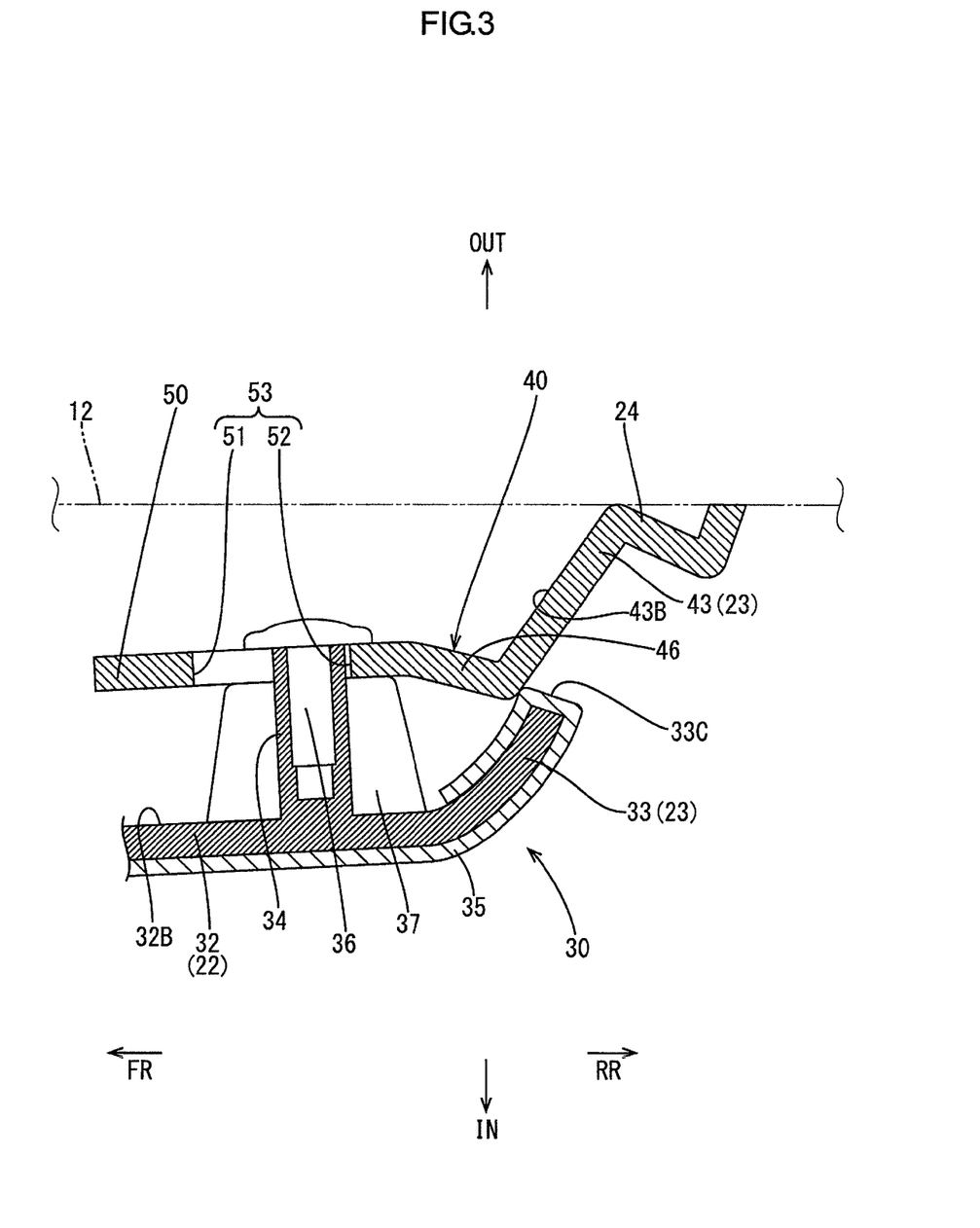
FIG. 3 is a cross-sectional view of a part the door trim wherein the upper board and the main board in FIG. 2 are deformed in a side collision.

As illustrated in FIG. 3, if a side collision occurs in a vehicle, the inner panel 12 is moved toward a vehicular interior side. The inner panel 12 that is moved toward a vehicular interior side directly or indirectly comes in contact with the main body side wall portion 43 and the main body side wall portion 43 receives a load directing from the vehicular exterior side toward the vehicular interior side. The main body side wall portion 43 is located between the main wall portion 22 (or an occupant who is on the vehicular interior side with respect to the main surface 22A) and the inner panel 12.

In this embodiment, as the main body side wall portion 43 receives the load, the main body side wall portion 43 is deformed and the extended portion 50 including the clearance portion 52 is relatively moved toward the middle portion of the main wall portion 22 (the main surface 22A) with respect to the mount projection 34 that is inserted through the insertion through hole 51. Specifically, the extended portion 50 is moved frontward with respect to the mount projection 34 so that the mount projection 34 relatively moves within the elongated through hole 53 to the clearance portion 52.

The extended portion 50 slides on the vehicular exterior surfaces of the reinforcing ribs 37 and relatively moves with respect to the mount projection 34. The extended basal portion 46 relatively moves with respect to the interior part side wall portion 33 so that the plate surface 46A of the extended basal portion 46 slides on the end surface of the side edge portion 33C of the interior part side wall portion 33. Therefore, the side edge portion 33C of the interior part side wall portion 33 is less likely to overlap the rear surface 43B of the main body side wall portion 43 and the sliding of the extended portion 50 is less likely to be hindered by the contact of the interior part side wall portion 33 and the main body side wall portion 43.

If the extended portion 50 is relatively moved toward the middle portion of the main wall portion 22 with respect to the mount projection 34 according to the deformation of the main body side wall portion 43, the extended basal portion 46 (a vehicular interior side end portion) of the main body side wall portion 43 is moved toward the middle portion of the main wall portion 22. The vehicular interior side end portion of the main body side wall portion 43 receives a force directing toward the middle portion of the main wall portion 22 and the main body side wall portion 43 also receives the load directing in the vehicular interior-exterior direction (toward the vehicular interior side) that is caused in the side collision. Therefore, the main body side wall portion 43 is effectively deformed and tilted outwardly as a whole with respect to the main wall portion 22 so that the door trim 20 is effectively crashed. According to the configuration of this embodiment, a groove is not necessary to be formed in the rear surface 43B of the main body side wall portion 43 to lower strength of the main body side wall portion 43 and a design of the design surface 23A of the side wall portion 23 (the main body side wall portion 43) may not be hindered.

Advantageous effects of this embodiment will be described.

According to this embodiment, the extended portion 50 includes the clearance portion 52. Therefore, the side wall portion 23 (the main body side wall portion 43) effectively maintains a design and rigidity during normal usage thereof. Further, in the collision, the extended portion 50 is relatively moved toward the middle portion of the main wall portion 22 with respect to the mount projection 34 due to the load caused by the collision and accordingly, the main body side wall portion 43 is easily and effectively deformed and tilted outwardly with respect to the main wall portion 22. The main body side wall portion 43 is deformed and tilted outwardly with respect to the main wall portion 22 so that the door trim 20 is crashed. Accordingly, the door trim 20 effectively absorbs shock energy generated in the vehicle's collision. The door trim 20 absorbs the shock energy generated in the vehicle's collision and damage to the occupant who is on the vehicular interior side with respect to the main wall portion 22 can be effectively reduced.

In this embodiment, the elongated through hole 53 has a substantially constant short-side dimension. Therefore, the extended portion 50 is moved toward the middle portion of the main wall portion 22 smoothly when the mount projection 34 relatively slides along the hole edge of the elongated through hole 53. Thus, the mount projection 34 relatively moves within the elongated hole 53 to the clearance portion 52 without any obstacles. Therefore, the main body side wall portion 43 is more easily and effectively deformed and tilted outwardly with respect to the main wall portion 22. For example, the extended portion may not include the elongated through hole but include only the insertion through hole having a size corresponding to a size of the mount projection and a hole edge of the insertion through hole may have a lowered strength (for example, a decreased thickness). In such a configuration, the hole edge having the lowered strength may be broken according to the deformation of the main body side wall portion and the extended portion may be moved in the vehicle's collision.

In this embodiment, the mount projection 34 is in the insertion through hole 51 of the elongated through hole 53 and is in the portion of the elongated through hole 53 closer to the middle portion of the main wall portion 22 with respect to the clearance portion 52. The mount projection 34 is held against the hole edge of the insertion through hole 51 that is on the distal end side of the extended portion 50 in the elongated through hole 53 with respect to the clearance portion 52. If the mount projection is not held against the hole edge of the insertion through hole that is on the distal end side of the extended portion in the elongated through hole with respect to the clearance portion, a mounting force by which the mount projection is mounted on the extended portion may be lowered. However, in this embodiment, the mount projection 34 is held against the hole edge of the insertion through hole 51 and therefore, the mounting force is less likely to be lowered.

Second Embodiment

Figure 5:
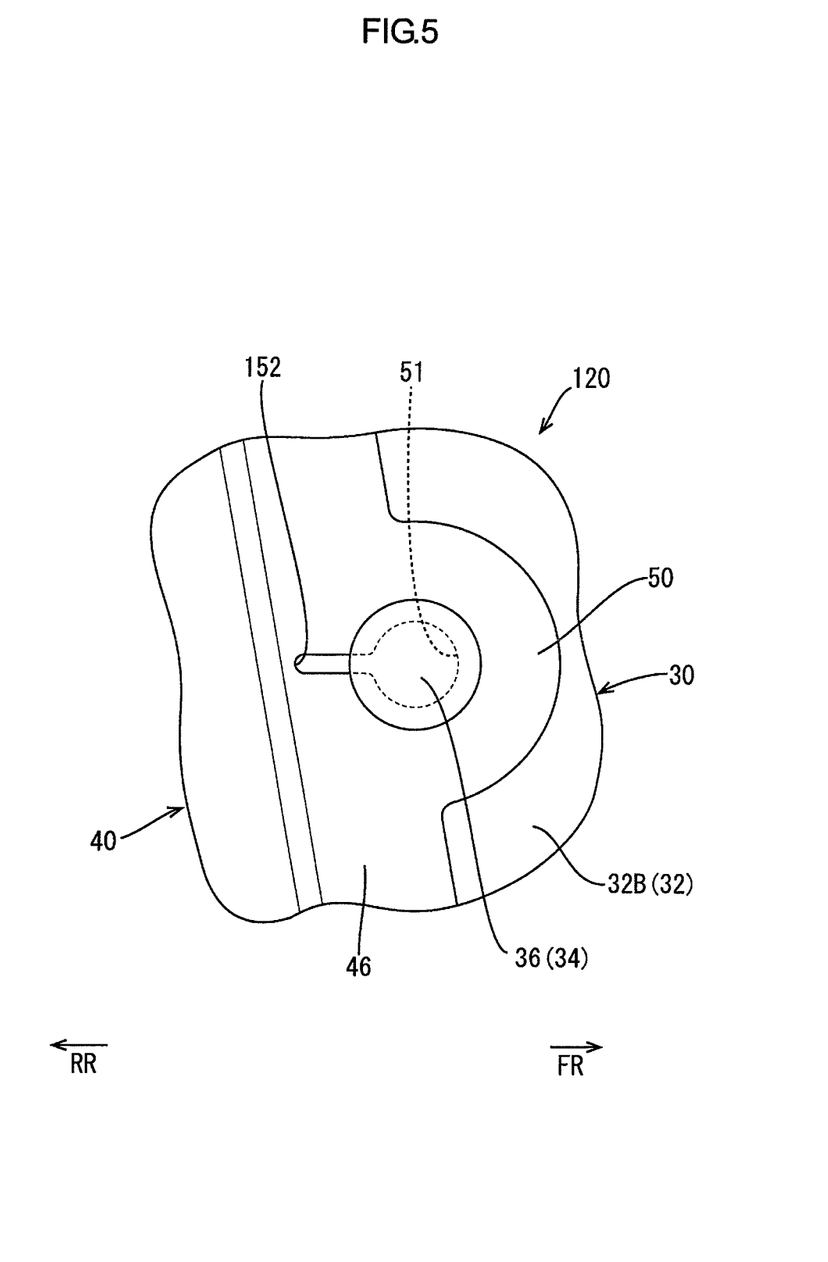
FIG. 5 is a rear plan view of a part of a door trim including an extended portion and a clearance portion according to a second embodiment.

Next, a second embodiment of this technology will be described with reference to FIG. 5. According to this embodiment, a door trim 120 includes a clearance portion 152 that has a shape different from that of the clearance portion 52 of the first embodiment. In the following embodiments, configurations, operations, and effects same as those in the first embodiment will not be described.

An elongated portion 150 includes the clearance portion 152 that is a slit and communicated with the insertion through hole 51. The clearance portion 152 has a short side dimension that is quite smaller than a diameter of the insertion through hole 51.

The clearance portion 152 is formed by cutting away a portion (a vehicular rear side portion with respect to the insertion through hole 51) of the extended portion 150, and the portion of the extended portion 150 is on the outer periphery side of the main wall portion (the main surface 22A) with respect to the insertion through hole 51. The clearance portion 152 is the slit extending from the hole edge of the insertion through hole 51 toward the outer periphery of the main wall portion 22 (the main surface 22A). In this embodiment, in the vehicle's collision, the main board 40 is deformed by the shock caused by the collision similarly to the first embodiment and the extended portion 150 is moved with respect to the mount projection 34 and the main body side wall portion 43 is deformed and tilted outward. Accordingly, the extended portion 150 is moved frontward with being broken around the clearance portion 152 that is the slit having a low strength. Thus, the side wall portion effectively maintains a design and rigidity during normal usage thereof. Further, in the collision, the main body side wall portion 43 is deformed and tilted outwardly with respect to the main wall portion 22 so that the door trim effectively absorbs shock energy caused by the vehicle's collision.

In this embodiment, the clearance portion 152 is the slit and therefore, a mounting force by which the mount projection 34 is mounted on the extended portion 150 is less likely to be lowered.

Other Embodiments

The present technology is not limited to the description as described above with reference to the drawings. For example, the present technology may include following embodiments.

(1) The vehicular interior part is not limited to the door trim but may be a quarter trim, an instrument panel, or a pillar garnish. The present technology may be applied to one or some of the vehicular interior parts.

(2) The clearance portion may be holes (of perforation) formed independently from the insertion through hole and near the insertion through hole or may be a thin portion included in a part of the hole edge of the insertion through hole and having a thickness smaller than other part of the hole edge.

(3) The mount projection may be fixed to the extended portion with thermal caulking.

(4) The interior part is not necessarily the upper board and the trim main body is not necessarily the main board.

(5) The upper board (the interior part) may not include the interior part side wall portion.

(6) The main board (the trim main body) may not include the main body main wall portion or/and the extended basal portion.

(7) The trim board may include the upper boar, the main board, and an ornament. The trim board may include a plurality of board portions such as a middle board portion and a lower board portion.

(8) The number and a shape of the extended portion including the clearance portion may be altered if necessary, and a portion of the extended portion where the clearance portion is formed may be altered if necessary.

The invention claimed is:

1. A vehicular interior part comprising:
a main wall portion having a main surface facing a vehicular interior side and having an outer peripheral edge and a middle portion;
a side wall portion extending from the outer peripheral edge toward a vehicular exterior side;
an interior part including:
an interior part main wall portion that is a part of the main wall portion and having a rear surface that is opposite to the main surface; and
a mount projection projecting from the rear surface; and
a trim main body mounted on the interior part and on a vehicular exterior side with respect to the interior part, the trim main body including:
a main body side wall portion that is a part of the side wall portion; and
an extended portion extending from the main body side wall portion toward the middle portion of the main wall portion along the rear surface of the interior part main wall portion, the extended portion including an insertion through hole and a clearance portion, the insertion through hole in which the mount projection is, and the clearance portion being adjacent to the insertion through hole and with which the extended portion is movable toward the middle portion of the main wall portion relative to the mount projection that is in the insertion through hole in response that the main body side wall portion receives a load in a vehicular interior-exterior direction.

2. The vehicular interior part according to claim 1, wherein
the clearance portion is a through hole and the clearance portion and the insertion through hole are communicated with each other to form an elongated through hole, and
the elongated through hole is elongated toward the outer peripheral edge of the main wall portion.

3. The vehicular interior part according to claim 2, wherein
the elongated through hole includes the insertion through hole on a middle portion side of the main wall portion with respect to the clearance portion, and
the insertion through hole has a hole edge and the mount projection is held against the hole edge.

4. The vehicular interior part according to claim 1, wherein
the clearance portion is a through hole that is through the extended portion and communicated with the insertion through hole.

5. The vehicular interior part according to claim 4, wherein
the clearance portion is on an outer peripheral edge side of the main wall portion with respect to the insertion through hole.

6. The vehicular interior part according to claim 5, wherein
the insertion through hole has a hole edge and the mount projection is held against the hole edge.

7. The vehicular interior part according to claim 4, wherein the extended portion includes an extended basal portion that is continuous from the main body side wall portion and from which the extended portion extends, and the extended portion includes the clearance portion on an extended basal portion side with respect to the insertion through hole.

8. The vehicular interior part according to claim 4, wherein the main body side wall portion has an exterior edge portion on the vehicular exterior side with respect to the extended portion and the exterior edge portion is in contact with an inner panel.

9. The vehicular interior part according to claim 4, wherein the insertion through hole has an opening size that fits the mount projection.

10. The vehicular interior part according to claim 4, wherein the extended portion is on the vehicular exterior side with respect to the interior part main wall portion and overlaps the interior part main wall portion, and the mount projection is in the insertion through hole.

11. The vehicular interior part according to claim 4, wherein the extended portion extends toward a vehicular front side from the main body side wall portion that is on a vehicular rear side.

12. A vehicular interior part comprising:

a main wall portion having a main surface facing a vehicular interior side and having an outer peripheral edge and a middle portion;

a side wall portion extending from the outer peripheral edge toward a vehicular exterior side;

an interior part including:
 an interior part main wall portion that is a part of the main wall portion and having a rear surface that is opposite to the main surface; and
 a mount projection projecting from the rear surface; and a trim main body mounted on the interior part and on a vehicular exterior side with respect to the interior part, the trim main body including:
 a main body side wall portion that is a part of the side wall portion; and
 an extended portion extending from the main body side wall portion toward the middle portion of the main wall portion along the rear surface of the interior part main wall portion, the extended portion including an insertion through hole and a clearance portion, the insertion through hole in which the mount projection is, and the clearance portion being adjacent to the insertion through hole and with which the extended portion is movable toward the middle portion of the main wall portion relative to the mount projection that is in the insertion through hole in response that the main body side wall portion receives a load in a vehicular interior-exterior direction, wherein the clearance portion is a through hole that is through the extended portion and communicated with the insertion through hole the extended portion includes an extended basal portion that is continuous from the main body side wall portion and from which the extended portion extends, the extended portion includes the clearance portion on an extended basal portion side with respect to the insertion through hole, the interior part further includes an interior part side wall portion that is a part of the side wall portion and the interior part side wall portion and the main body side wall portion constitute the side wall portion, the interior part side wall portion has a side edge portion having an edge surface that faces the vehicular exterior side, and the extended basal portion has a contact surface facing the vehicular interior side and the edge surface of the interior part side wall portion is in contact with the contact surface of the extended basal portion.

13. A vehicular interior part comprising:

a main wall portion having a main surface facing a vehicular interior side and having an outer peripheral edge and a middle portion;

a side wall portion extending from the outer peripheral edge toward a vehicular exterior side;

an interior part including:
 an interior part main wall portion that is a part of the main wall portion and having a rear surface that is opposite to the main surface; and
 a mount projection projecting from the rear surface; and a trim main body mounted on the interior part and on a vehicular exterior side with respect to the interior part, the trim main body including:
 a main body side wall portion that is a part of the side wall portion; and
 an extended portion extending from the main body side wall portion toward the middle portion of the main wall portion along the rear surface of the interior part main wall portion, the extended portion including an insertion through hole and a clearance portion, the insertion through hole in which the mount projection is, and the clearance portion being adjacent to the insertion through hole and with which the extended portion is movable toward the middle portion of the main wall portion relative to the mount projection that is in the insertion through hole in response that the main body side wall portion receives a load in a vehicular interior-exterior direction, wherein the clearance portion is a through hole that is through the extended portion and communicated with the insertion through hole, the extended portion has an extended distal end, and the insertion through hole is on an extended distal end side with respect to the clearance portion.

14. A vehicular interior part comprising:

a main wall portion having a main surface facing a vehicular interior side and having an outer peripheral edge and a middle portion;

a side wall portion extending from the outer peripheral edge toward a vehicular exterior side;

an interior part including:
 an interior part main wall portion that is a part of the main wall portion and having a rear surface that is opposite to the main surface; and
 a mount projection projecting from the rear surface; and a trim main body mounted on the interior part and on a vehicular exterior side with respect to the interior part, the trim main body including:
 a main body side wall portion that is a part of the side wall portion; and
 an extended portion extending from the main body side wall portion toward the middle portion of the main wall portion along the rear surface of the interior part main wall portion, the extended portion including an insertion through hole and a clearance portion, the insertion through hole in which the mount projection is, and the clearance portion being adjacent to the insertion through hole and with which the extended portion is movable toward the middle portion of the main wall portion relative to the mount projection that is in the insertion through hole in response that the main body side wall portion receives a load in a vehicular interior-exterior direction, wherein the clearance portion is a through hole and the clearance portion and the insertion through hole are communicated with each other to form an elongated through hole, and the elongated through hole is elongated toward the outer peripheral edge of the main wall portion, the extended portion has an extended distal end, and the insertion through hole is on an extended distal end side with respect to the clearance portion in the elongated through hole.

\* \* \* \* \*